United States Patent Office 2,726,224
Patented Dec. 6, 1955

2,726,224

ACCELERATION OF THE REACTION BETWEEN BUTYL RUBBER AND DIMETHYLOL PHENOLS BY MEANS OF HEAVY METAL HALIDES, AND PRODUCT OBTAINED THEREBY

Lester C. Peterson and Harvey J. Batts, Indianapolis, Ind., assignors to United States Rubber Company, New York, N. Y., a corporation of New Jersey No Drawing. Application January 2, 1953,
Serial No. 329,444

11 Claims. (Cl. 260—38)

This invention relates to a process for modifying Butyl rubber, and more particularly it relates to a process for accelerating reaction between Butyl rubber and dimethylol phenols, as well as to improved products obtained thereby.

A copending application of Tawney and Little, Serial No. 266,146, filed January 12, 1952, now U. S. Patent 2,701,895, discloses and claims the vulcanization of Butyl rubber with dimethylol phenols. It has been desired to render the vulcanization of Butyl rubber with dimethylol phenols more convenient and more economical, by reducing the time and temperature necessary to attain a practical cure by this method. Accordingly, the principal object of the present invention is to provide a method of accelerating the aforesaid vulcanization process.

We have now discovered that the cure of Butyl rubber with dimethylol phenols is greatly accelerated by the presence of a small amount of a heavy metal halide, and excellent cures can be obtained in a considerably shorter time, or at a lower temperature, than would otherwise be possible. Another remarkable feature of the use of a heavy metal halide to accelerate the dimethylol phenol cure of Butyl rubber is that it makes possible a substantial reduction in the amount of dimethylol phenol that is necessary to produce a given state of cure. Another unexpected advantage of the acceleration of the cure with heavy metal halides in accordance with the invention, is that improved vulcanizates of low hysteresis can be produced in this way.

Butyl rubber, as is well known, is the type of synthetic rubber made by copolymerizing an isoolefin, usually isobutylene, with a minor proportion of a multi-olefinic unsaturate having from 4 to 14 carbon atoms per molecule. The isoolefins used generally have from 4 to 7 carbon atoms, and such isomonoolefins as isobutylene or ethyl methyl ethylene are preferred. The multi-olefinic unsaturate usually is an aliphatic conjugated diolefin having from 4 to 6 carbon atoms, and is preferably isoprene or butadiene. Other suitable diolefins that may be mentioned are such compounds as piperylene; 2,3-dimethyl butadiene-1,3; 1,2-dimethyl butadiene-1,3; 1,3-dimethyl butadiene-1,3; 1-ethyl butadiene-1,3 and 1,4-dimethyl butadiene-1,3. The Butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generally by the term Butyl rubber.

In accordance with one aspect of the invention, the Butyl rubber is compounded for vulcanization with a dimethylol phenol as a curing agent, using a heavy metal halide as the accelerator. The dimethylol phenol curing agents are known materials. The dimethylol phenol employed may be essentially a monomeric material, or it may be a polymeric material formed by self-condensation of the dimethylol phenol to yield a heat-reactive, oil-soluble, resinous product. Such resinous polymeric dimethylol phenols are the preferred materials for use in manufacturing the puncture-sealant from Butyl rubber in accordance with the method of the invention. Mixtures of the resinous polymeric dimethylol phenols with more or less of low molecular weight or monomeric dimethylol phenols are also useful. For convenience, the term dimethylol phenol will be used to refer to any of the monomeric or polymeric compounds, or to mixtures thereof, unless otherwise stated. The polymeric dimethylol phenols are well known resinous materials, frequently used in making varnishes and the like. They are generally solids and are therefore more convenient to handle than the monomeric dimethylol phenols, which are frequently liquids in the crude form, and tend to be malodorous and lachrymatory. The resinous dimethylol phenols are also more effective in producing the desired physical properties in the Butyl.

As will be understood by those skilled in the art, the dimethylol phenols are typically made by reacting a para-substituted phenol having the two ortho positions unoccupied, with a considerable molar excess of formaldehyde, the molar ratio of formaldehyde to phenol typically being 2:1, in the presence of a strong alkaline catalyst, especially an alkali metal hydroxide, which is subsequently neutralized. Typically the mixture of the phenol, formaldehyde and alkaline catalyst is heated at a suitable temperature, e. g., 25–100° C., the first stage of the reaction involving formation of the phenol methylol, i. e., the para-substituted-2,6-dimethylol phenol. This material, which is a phenol dialcohol, can be isolated by acidification of the mixture and separation of the oily layer which can then be advanced to higher molecular weight form by heating at say 75–175° C. This higher molecular weight form is oil-soluble and heat-reactive, and has the advantages that it is more reactive with the Butyl rubber than the lower molecular weight form. Separation of the phenol dialcohol can be omitted, in which case the reaction is carried past the monomer stage to the resinous stage, whereupon the mixture is neutralized and water is removed to give the resinous material. In any case care should be taken to stop while the resin is in the soluble (in conventional organic solvents and drying oils) and fusible state. This is the resol type of resin.

The phenol from which the dimethylol phenol is made generally has a hydrocarbon group in the position para to the phenolic hydroxyl, examples being alkyl groups, especially alkyl groups having from 3 to 20 carbon atoms, tertiary-butyl and tertiary-octyl (alpha, alpha, gamma, gamma-tetramethyl butyl) being especially preferred, cycloalkyl groups, aryl groups such as phenyl and aralkyl groups such as benzyl and cumyl. We believe that such lower alkyls (8 carbon atoms or less) as the tertiary-butyl and the aforementioned branched octyl are outstanding. Examples of suitable dimethylol phenols that may be used in the invention either in the polymeric or monomeric form are as follows:

2,6-dimethylol-4-methyl phenol
2,6-dimethylol-4-tertiary-butyl phenol
2,6-dimethylol-4-octyl phenol
2,6-dimethylol-4-dodecyl phenol
2,6-dimethylol-4-phenyl phenol
2,6-dimethylol-4-benzyl phenol
2,6-dimethylol-4-(alpha, alpha-dimethyl benzyl) phenol
2,6-dimethylol-4-cyclohexyl phenol The dimethylol phenol is employed in amount within the range of from about 2 to 15 parts by weight to 100 parts of the butyl rubber. While smaller amounts of the dimethylol phenol may be employed, e. g. 1 part, it is usually found that less than this amount is insufficient to produce a practical cure within a reasonable time. However, if only a limited or partial reaction between the dimethylol and the butyl rubber is all that is required, then very small amounts may suffice, as will be more fully explained below. Also, larger amounts may be used, e. g., 20 parts, but amounts greater than this are without further advantage.

The amount of heavy metal halide employed in the invention is not critical and may vary considerably, provided that it is employed in amount sufficient to effect acceleration. Usually only a very small amount is used, since the heavy metal halides are extremely potent in their accelerating action. Thus, definite accelerating effect may be noted with as little as a few tenths of a part of the heavy metal halide in 100 parts of Buytl rubber, although we generally use somewhat more than this, say 1 to 3 parts per 100 parts of the Butyl. Although in some cases even larger amounts of the accelerator can be used, say 10 parts, it is not generally necessary or desirable to use appreciably more than about 5 parts. In the majority of cases we limit the amount of accelerator to 5 parts or less, and we may even limit it to 1 or 2 parts at times.

The heavy metal halide accelerators of the invention are exemplified by such known stable acidic halides as tin chloride, zinc chloride, iron chloride and, in general, halides of the various metals usually classified as heavy metals (cf. the periodic chart of the elements in "Introductory College Chemistry" by H. G. Deming, published by John Wiley and Sons, Inc.). This class includes, inter alia, aluminum chloride, chromium chloride and nickel chloride, as well as cobalt chloride, manganese chloride, and copper chloride. Although copper halides are capable of producing acceleration, we prefer not to use them because of the deleterious effect of copper on the Butyl rubber in other respects. The heavy metal chlorides constitute the preferred class of accelerators for use in the invention. However, acceleration is obtainable with heavy metal salts of other halides such as aluminum bromide and stannic iodide. Heavy metal fluorides such as aluminum fluoride can accelerate, although aluminum fluoride is not particularly desirable because of its high melting point and corrosiveness. Similarly, aluminum chloride is not particularly preferred and if it is used, it is preferably not employed in amount greater than 1 part. Of the heavy metal chlorides, the most preferred are those of tin, iron and zinc. The heavy metal halides are effective independently of the state of oxidation of the metal, and they are even effective if the halide is partially hydrolyzed, or is only a partial halide, as in zinc oxychloride.

In carrying out the invention, the Butyl rubber, dimethylol phenol, and heavy metal halide, and any additional desired ingredients, may be mixed together in any desired order according to the procedures ordinarily used in mixing rubber compounds, with the aid of the usual rubber mixing equipment, such as an internal mixer or roll mills.

The vulcanizable mixture resulting from the foregoing ingredients may be fabricated into the desired form by the usual methods, such as calendering, extrusion, or molding, and subsequently vulcanized by heating, preferably while confined under pressure.

For the purpose of making such articles as curing bags or inner tubes, there is generally included in the mixture a quantity of a suitable reinforcing material, preferably carbon black. Although from at least about 20 to 100 parts by weight of carbon black may be employed per 100 parts of the Butyl rubber, it is generally preferred to use from about 40 to 80 parts of black, and most preferably about 50 or 60 parts. Other compounding ingredients, such as other fillers, processing aids, etc., may be included in the mixture if desired.

The curing process of the invention is conveniently carried out at temperatures of 200° F. or more, and preferably at temperatures in excess of 300° F., for periods of time ranging from about 5 minutes to 3 hours, the longer periods of time within the stated time range being employed with the lower temperatures. The most preferred vulcanizing temperatures are within the range of about 320° to 370° F., although somewhat higher temperatures may be employed, e. g., 390° or 400° F., provided that such highly elevated temperatures are not maintained for a sufficiently long time to cause thermal injury to the article.

The following examples will serve to illustrate the invention in more detail.

EXAMPLE I

Two stocks were made up by mixing the material shown in the Table I in the stated amounts, one of the stocks containing no zinc chloride, and the other stock containing zinc chloride. Portions of the stocks were cured for varying times as indicated, and the properties of the resulting vulcanizates were measured, with the results noted in the table. The GR-I 18 was a commercial grade of synthetic rubber made by copolymerizing isobutylene and isoprene, and containing about 2½% of combined isoprene. The Amberol ST-137 was a commercial phenolic resin of the dimethylol phenol class, and it is believed to be made from about 1 mole of p-octyl phenol, 2 moles of formaldehyde and 1 mole of sodium hydroxide, the alkali being carefully neutralized after the condensation is complete. The zinc chloride was added to the Butyl rubber in the form of a concentrated aqueous solution. The compound was then hot milled for 15 minutes at 235° F. to expel the water. The stock was cooled, and after the addition of the resin, it was milled 5 minutes at 225° F. to disperse the resin.

Table I

| | | I-A | I-B |
|---|---|---|---|
| Parts by Weight: | | | |
| GR-I 18 | | 100 | 100 |
| EPC Carbon Black | | 60 | 60 |
| Stearic Acid | | 1 | 1 |
| Zinc Chloride | | | 5 |
| ST-137 Resin | | 12 | 12 |
| Properties: | Cure at 350° F., minutes | | |
| Tensile Strength (p. s. i.) | 5 | 645 | 2,760 |
| | 10 | 770 | 2,600 |
| | 15 | 1,760 | 2,860 |
| | 30 | 2,560 | 2,700 |
| | 45 | 2,710 | 2,780 |
| | 60 | 2,800 | 2,820 |
| Elongation at Break, Percent | 5 | >1,100 | 450 |
| | 10 | 580 | 400 |
| | 15 | 680 | 380 |
| | 30 | 630 | 360 |
| | 45 | 560 | 340 |
| | 60 | 510 | 300 |
| 300% Modulus, p. s. i. | 5 | 105 | 1,800 |
| | 10 | 215 | 1,880 |
| | 15 | 540 | 2,200 |
| | 30 | 960 | 2,250 |
| | 45 | 1,250 | 2,600 |
| | 60 | 1,450 | 2,820 |
| 500% Modulus, p. s. i. | 5 | 170 | |
| | 10 | 615 | |
| | 15 | 1,265 | |
| | 30 | 2,100 | |
| | 45 | 2,540 | |
| | 60 | 2,740 | |
| Hardness (Shore Durometer, A Scale) | 5 | 53 | 59 |
| | 10 | 46 | 62 |
| | 15 | 57 | 64 |
| | 30 | 61 | 65 |
| | 45 | 64 | 65 |
| | 60 | 65 | 65 |
| Hot Flow, Percent elongation under an original stress of 50 p. s. i. applied for times and temperature indicated, 340° F.— | | | |
| 6 hrs | 15 | 13.3 | 12.2 |
| | 30 | 43 | 7 |
| 24 hrs | 15 | 64 | 22 |
| | 30 | 60 | 18.6 |
| 48 hrs | 15 | | 30 |
| | 30 | 71 | 33 |

The data in Table I indicate that the stock I-B containing the zinc chloride was greatly accelerated, compared to the stock I-A containing no zinc chloride. The use of zinc chloride produced high tensile strength, and high modulus, in very short cure times. The results of the hot flow test, given at the lower portion of the table, reveal another important advantage of the invention, namely, the compositions including the zinc chloride did not flow as much under the influence of continued application of stress at elevated temperature. The hot flow of the composition is an important factor in determining the utility of a vulcanizate for service at high temperatures, as in curing bags. A hot flow test is described in Industrial and Engineering Chemistry, November 1948, p. 2180.

EXAMPLE II

In this example the accelerated dimethylol phenol cure is compared to a typical sulfur cure of Butyl rubber. The two base stocks shown in Table II were given identical milling.

Table II

|  |  | II-A | II-B |
|---|---|---|---|
|  |  | 1 | 2 |
| Parts by Weight: |  |  |  |
| GR-I 18 |  | 100 | 100 |
| SRF (carbon black) |  | 35 | 35 |
| FEF (carbon black) |  | 30 | 30 |
| Zinc Oxide |  | 3 |  |
| Stearic Acid |  | 1 | 1 |
| Mineral Oil |  | 25 | 25 |
| Zinc Chloride |  |  | 5 |
| Tuex |  | 1.25 |  |
| Captax |  | 1 |  |
| ST-137 Resin |  |  | 12 |
| Sulphur |  | 1.25 |  |
| Properties: | Cure at 350° F., minutes |  |  |
| Tensile | 5 | 1,810 | 1,515 |
|  | 10 | 1,890 | 1,640 |
|  | 15 | 1,810 | 1,630 |
|  | 20 | 1,670 | 1,675 |
| Elongation | 5 | 790 | 630 |
|  | 10 | 750 | 630 |
|  | 15 | 730 | 640 |
|  | 20 | 690 | 560 |
| 300% Modulus | 5 | 370 | 620 |
|  | 10 | 520 | 705 |
|  | 15 | 540 | 670 |
|  | 20 | 505 | 825 |
| 500% Modulus | 5 | 765 | 1,265 |
|  | 10 | 960 | 1,390 |
|  | 15 | 1,000 | 1,370 |
|  | 20 | 1,040 | 1,555 |
| Hardness | 5 | 45 | 38 |
|  | 10 | 49 | 40 |
|  | 15 | 50 | 40 |
|  | 20 | 49 | 41 |
| Torsional Hysteresis at 100° F. (Measured per the method of the Gerke Patent 2,118,601.) | 5 | .211 | .136 |
|  | 10 | .193 | .128 |
|  | 15 | .180 | .116 |
|  | 20 | .197 | .111 |
| Torsional Hysteresis at 285° F. | 5 | .132 | .078 |
|  | 10 | .132 | .074 |
|  | 15 | .128 | .066 |
|  | 20 | .132 | .062 |

In the Table II, the hysteresis values are of greatest interest, since they illustrate an entirely unexpected advantage of the heavy metal chloride acceleration, namely, it makes possible a vulcanizate having from 35% to 55% lower torsional hysteresis, than is obtained in an oil-bearing stock cured with sulfur.

EXAMPLE III

Table III further illustrates the practice of the invention with zinc chloride, and also shows the remarkable accelerating effect obtained with stannous chloride. In stock III–F the stannous chloride was employed in crystalline form ($SnCl_2 \cdot 2H_2O$), and represents one of the most preferred accelerating materials of the invention because it is highly effective and convenient to use. The crystalline stannous chloride may be added directly to the compound as a solid, since it melts at 100° F., and does not require solution in water. In stock III–D the stannous chloride was added as a solution in water. The physical properties obtained by adding such crystals to the stock are higher than those obtained when adding the accelerator as a solution in water. Stocks III–B and III–C, containing zinc sulfate and ferric sulfate, respectively, were included merely to show that the heavy metal sulfates did not produce acceleration, and were therefore entirely unlike the heavy metal chlorides in their action.

Table III

|  |  | III-A | III-B | III-C | III-D | III-E | III-F |
|---|---|---|---|---|---|---|---|
| Parts by Weight: |  |  |  |  |  |  |  |
| GR-I 18 |  | 100 | 100 | 100 | 100 | 100 | 100 |
| EPC |  | 60 | 60 | 60 | 60 | 60 | 60 |
| Stearic Acid |  | 1 | 1 | 1 | 1 | 1 | 1 |
| Zinc Sulphate |  |  | 5 |  |  |  |  |
| Ferric Sulphate |  |  |  | 5 |  |  |  |
| Stannous Chloride |  |  |  |  | ² 5 |  | ³ 5 |
| Zinc Chloride |  |  |  |  |  | 5 |  |
| ST-137 Resin |  | 12 | 12 | 12 | 12 | 12 | 12 |
| Properties: | Cure at 350° F., minutes |  |  |  |  |  |  |
| Tensile | 5 | No Cure | No Cure | No Cure | 1,070 | 2,510 | 2,500 |
|  | 10 | 1,280 | No Cure | No Cure | 2,140 | 2,730 | 2,560 |
|  | 15 | 1,380 | ¹ 1,010 | ¹ 945 | 2,290 | 2,810 | 2,440 |
|  | 30 | 2,370 | 2,360 | 1,950 | 1,150 | 2,790 | 2,080 |
|  | 45 | 2,660 | 2,390 | 2,300 | 1,185 | 2,860 | 2,170 |
|  | 60 | 2,650 | 2,480 | 2,520 | 2,260 | 2,890 | 2,030 |
| Elongation | 5 |  |  |  | 160 | 480 | 360 |
|  | 10 | 900 |  |  | 190 | 460 | 280 |
|  | 15 | 610 | ¹ 510 | ¹ 600 | 170 | 460 | 250 |
|  | 30 | 610 | 680 | 710 | 110 | 410 | 180 |
|  | 45 | 590 | 590 | 700 | 160 | 400 | 190 |
|  | 60 | 560 | 540 | 670 | 170 | 360 | 170 |
| 300% Modulus | 5 |  |  |  |  | 1,230 | 1,750 |
|  | 10 | 270 |  |  |  | 1,550 |  |
|  | 15 | 415 | ¹ 425 | ¹ 270 |  | 1,590 |  |
|  | 30 | 850 | 830 | 565 |  | 1,815 |  |
|  | 45 | 1,125 | 1,000 | 715 |  | 1,975 |  |
|  | 60 | 1,275 | 1,250 | 815 |  | 2,360 |  |
| 500% Modulus | 5 |  |  |  |  |  |  |
|  | 10 | 655 |  |  |  |  |  |
|  | 15 | 1,055 | ¹ 1,000 | ¹ 735 |  |  |  |
|  | 30 | 1,910 | 1,800 | 1,350 |  |  |  |
|  | 45 | 2,360 | 2,150 | 1,720 |  |  |  |
|  | 60 | 2,520 | 2,360 | 1,925 |  |  |  |
| Hardness | 5 |  |  |  | 64 | 57 | 63 |
|  | 10 | 56 |  |  | 67 | 60 | 66 |
|  | 15 | 62 | ¹ 60 | ¹ 48 | 68 | 62 | 68 |
|  | 30 | 62 | 68 | 59 | 69 | 63 | 68 |
|  | 45 | 64 | 71 | 61 | 69 | 64 | 69 |
|  | 60 | 64 | 73 | 61 | 70 | 64 | 71 |

¹ Porous.  ² Added in water.  ³ Added in crystalline form.

EXAMPLE IV

In Table IV, the use of stannous chloride in stocks IV-G and IV-H, and the use of zinc chloride in stocks IV-C and IV-D, are further illustrated, while stocks IV-E and IV-F illustrate the use of ferric chloride, and stocks IV-A and IV-B illustrate the accelerating effect obtained with stannic chloride. It will be noted that the ferric chloride is a particularly good accelerator.

Table IV

|  | IV-A | IV-B | IV-C | IV-D | IV-E | IV-F | IV-G | IV-H |
|---|---|---|---|---|---|---|---|---|
| GR-I 18 | 100 | 100 | 100 | 100 | 100 | 100 | 100 | 100 |
| EPC | 60 | 60 | 60 | 60 | 60 | 60 | 60 | 60 |
| Stearic Acid | 1 | 1 | 1 | 1 | 1 | 1 | 1 | 1 |
| ST-137 Resin | 12 | 12 | 12 | 12 | 12 | 12 | 12 | 12 |
| Stannic Chloride | 1 | 2 | | | | | | |
| Zinc Chloride | | | 1 | 2 | | | | |
| Ferric Chloride | | | | | 1 | 2 | | |
| Stannous Chloride | | | | | | | 1 | 2 |
| Tensile: | | | | | | | | |
| 5' at 350 | 815 | 2,500 | 2,240 | 1,930 | 1,740 | 2,820 | 2,140 | 2,600 |
| 10' at 350 | 1,365 | 2,870 | 2,440 | 2,240 | 2,290 | 2,790 | 2,440 | 2,720 |
| 15' at 350 | 2,140 | 2,840 | 2,580 | 2,340 | 2,570 | 2,800 | 2,440 | 2,800 |
| 30' at 350 | 2,490 | 2,650 | 2,490 | 2,670 | 2,600 | 2,920 | 2,560 | 2,600 |
| 45' at 350 | 2,720 | 2,540 | 2,750 | 2,680 | 2,790 | 2,920 | 2,730 | 2,660 |
| Elongation: | | | | | | | | |
| 5' at 350 | 700 | 520 | 650 | 550 | 800 | 570 | 700 | 600 |
| 10' at 350 | 650 | 510 | 600 | 510 | 710 | 520 | 580 | 540 |
| 15' at 350 | 710 | 470 | 570 | 510 | 680 | 490 | 510 | 470 |
| 30' at 350 | 630 | 380 | 490 | 480 | 580 | 460 | 490 | 400 |
| 45' at 350 | 600 | 350 | 490 | 450 | 580 | 430 | 450 | 390 |
| 300% Modulus: | | | | | | | | |
| 5' at 350 | 148 | 1,020 | 665 | 765 | 380 | 1,115 | 745 | 1,160 |
| 10' at 350 | 320 | 1,190 | 945 | 1,060 | 635 | 1,250 | 1,035 | 1,450 |
| 15' at 350 | 505 | 1,440 | 955 | 1,275 | 700 | 1,575 | 1,155 | 1,625 |
| 30' at 350 | 785 | 1,840 | 1,275 | 1,420 | 1,065 | 1,815 | 1,330 | 1,730 |
| 45' at 350 | 980 | 2,030 | 1,390 | 1,560 | 1,095 | 1,835 | 1,660 | 2,000 |
| 500% Modulus: | | | | | | | | |
| 5' at 350 | 435 | 2,380 | 1,700 | 1,750 | 1,025 | 2,570 | 1,715 | 2,260 |
| 10' at 350 | 900 | 2,740 | 2,110 | 2,170 | 1,600 | 2,700 | 2,180 | 2,540 |
| 15' at 350 | 1,390 | | 2,240 | 2,420 | 1,830 | | 2,370 | |
| 30' at 350 | 1,980 | | | | 2,200 | | | |
| 45' at 350 | 2,290 | | | | 2,520 | | | |
| Hardness: | | | | | | | | |
| 5' at 350 | 46 | 54 | 56 | 64 | 53 | 56 | 57 | 58 |
| 10' at 350 | 57 | 58 | 59 | 67 | 56 | 57 | 59 | 60 |
| 15' at 350 | 58 | 59 | 60 | 66 | 57 | 58 | 60 | 61 |
| 30' at 350 | 59 | 60 | 60 | 67 | 59 | 59 | 61 | 62 |
| 45' at 350 | 61 | 62 | 61 | 68 | 60 | 60 | 62 | 63 |

| Hot Flow, 340° F. | 1 | 2 | 3 | 4 | 5 | 6 |
|---|---|---|---|---|---|---|
| 6 hrs. 15' | >170 | 15.9 | 47.5 | 29.3 | 48.8 | 17.1 |
| 6 hrs. 30' | 67.5 | 11.3 | 39.6 | 28.2 | 43.2 | 11.4 |

EXAMPLE V

The following masterbatch was prepared:

Masterbatch: Parts by weight
GR-I 18 _____ 100
EPC Black _____ 60
Stearic acid _____ 1

The resin was added on a cool mill and dispersed for 5 minutes at 200° F. The stock was then cooled and stannous chloride was added to portions of the masterbatch in the amount shown in Table V below. The stannous chloride was added in the form of crystals ($SnCl_2 \cdot 2H_2O$).

The data demonstrates the remarkable reduction in the amounts of curative made possible by the use of stannous chloride crystals as accelerator.

Table V

|  |  | V-A | V-B | V-C | V-D | V-E |
|---|---|---|---|---|---|---|
| Parts by Weight: | | | | | | |
| Masterbatch | | 161 | 161 | 161 | 161 | 161 |
| ST-137 Resin | | 12 | 12 | 9 | 6 | 4 |
| $SnCl_2 \cdot 2H_2O$ | | 1 | 2 | 2 | 2 | 2 |
| Properties: | Cure at 350° F., minutes | | | | | |
| Tensile | 5 | 2,140 | 2,600 | 2,220 | 1,620 | 1,730 |
|  | 10 | 2,440 | 2,720 | 2,460 | 1,940 | 2,000 |
|  | 15 | 2,440 | 2,800 | 2,370 | 1,790 | 1,990 |
|  | 30 | 2,560 | 2,600 | 2,340 | 2,060 | 2,120 |
|  | 45 | 2,730 | 2,660 | 2,380 | 2,050 | 2,080 |
|  | 60 | 2,680 | 2,630 | 2,300 | 2,070 | 2,160 |
| Elongation | 5 | 700 | 600 | 520 | 500 | 500 |
|  | 10 | 580 | 540 | 450 | 460 | 450 |
|  | 15 | 510 | 470 | 440 | 400 | 420 |
|  | 30 | 490 | 400 | 380 | 380 | 380 |
|  | 45 | 450 | 390 | 360 | 340 | 340 |
|  | 60 | 420 | 350 | 320 | 320 | 330 |
| 300% Modulus | 5 | 745 | 1,160 | 1,120 | 760 | 875 |
|  | 10 | 1,035 | 1,450 | 1,440 | 1,085 | 1,190 |
|  | 15 | 1,155 | 1,625 | 1,500 | 1,300 | 1,250 |
|  | 30 | 1,330 | 1,730 | 1,820 | 1,550 | 1,525 |
|  | 45 | 1,660 | 2,000 | 2,050 | 1,790 | 1,825 |
|  | 60 | 1,825 | 2,210 | 2,200 | 1,900 | 2,000 |
| 500% Modulus | 5 | 1,715 | 2,260 | 2,160 | 1,620 | 1,730 |
|  | 10 | 2,180 | 2,540 | | | |
|  | 15 | 2,370 | | | | |
|  | 30 | | | | | |
|  | 45 | | | | | |
|  | 60 | | | | | |

Table V.—Continued

|  |  | V-A | V-B | V-C | V-D | V-E |
|---|---|---|---|---|---|---|
| Hardness | 5 | 57 | 58 | 59 | 59 | 59 |
|  | 10 | 59 | 60 | 62 | 60 | 61 |
|  | 15 | 60 | 61 | 65 | 60 | 63 |
|  | 30 | 61 | 62 | 65 | 62 | 64 |
|  | 45 | 62 | 63 | 66 | 63 | 64 |
|  | 60 | 64 | 63 | 66 | 63 | 64 |

EXAMPLE VI

This example is similar to Example V, except that ferric chloride is used as the accelerator. Ferric chloride is a most desirable accelerator, especially in the form of crystalline $FeCl_3 \cdot 6H_2O$, because it melts at 100° F., and may be added directly to the rubber mix as a solid. It is not only a very powerful accelerator, as indicated by the data in Table VI, but it is also very economical.

Table VI

|  |  | VI-A | VI-B | VI-C | VI-D | VI-E | VI-F |
|---|---|---|---|---|---|---|---|
| Parts by Weight: |  |  |  |  |  |  |  |
| Masterbatch |  | 161 | 161 | 161 | 161 | 161 | 161 |
| ST-137 Resin |  | 12 | 9 | 6 | 4 | 2 | 4 |
| $FeCl_3 \cdot 6H_2O$ |  | 2 | 2 | 2 | 2 | 2 | 4 |
|  | Cure at 350° F., minutes | 1 | 2 | 3 | 4 | 5 | 6 |
| Properties: |  |  |  |  |  |  |  |
| Tensile | 5 | 2,300 | 2,300 | 2,500 | 2,050 | 1,660 | 2,330 |
|  | 10 | 2,450 | 2,730 | 2,740 | 2,300 | 1,860 | 2,250 |
|  | 15 | 2,480 | 2,720 | 2,700 | 2,400 | 1,730 | 2,150 |
|  | 30 | 2,220 | 2,280 | 2,660 | 2,550 | 1,950 | 2,100 |
|  | 45 | 2,570 | 2,520 | 2,570 | 2,690 | 1,920 | 2,160 |
|  | 60 | 2,550 | 2,540 | 1,875 | 2,610 | 2,000 | 2,140 |
| Elongation | 5 | 370 | 350 | 420 | 410 | 500 | 410 |
|  | 10 | 340 | 400 | 430 | 410 | 500 | 400 |
|  | 15 | 330 | 420 | 400 | 430 | 450 | 370 |
|  | 30 | 290 | 330 | 380 | 410 | 500 | 320 |
|  | 45 | 310 | 330 | 380 | 440 | 500 | 350 |
|  | 60 | 320 | 340 | 270 | 430 | 510 | 360 |
| 300% Modulus | 5 | 1,860 | 1,970 | 1,590 | 1,340 | 1,165 | 1,625 |
|  | 10 | 2,180 | 2,220 | 1,900 | 1,590 | 840 | 1,680 |
|  | 15 | 2,250 | 1,830 | 1,860 | 1,540 | 880 | 1,770 |
|  | 30 | 2,230 | 2,230 | 1,890 | 1,630 | 885 | 1,870 |
|  | 45 | 2,490 | 2,380 | 2,000 | 1,560 | 910 | 1,830 |
|  | 60 | 2,440 | 2,380 | ------ | 1,610 | 1,000 | 1,830 |
| 500% Modulus | 5 | ------ | ------ | ------ | ------ | 1,645 | ------ |
|  | 10 | ------ | ------ | ------ | ------ | 1,840 | ------ |
|  | 15 | ------ | ------ | ------ | ------ | ------ | ------ |
|  | 30 | ------ | ------ | ------ | ------ | 1,950 | ------ |
|  | 45 | ------ | ------ | ------ | ------ | 1,900 | ------ |
|  | 60 | ------ | ------ | ------ | ------ | 1,970 | ------ |
| Hardness | 5 | 60 | 60 | 60 | 58 | 55 | 58 |
|  | 10 | 62 | 62 | 60 | 59 | 56 | 60 |
|  | 15 | 62 | 62 | 60 | 59 | 56 | 60 |
|  | 30 | 62 | 62 | 62 | 60 | 58 | 60 |
|  | 45 | 63 | 63 | 61 | 61 | 58 | 63 |
|  | 60 | 64 | 64 | 59 | 61 | 56 | 63 |

EXAMPLE VII

Table VII illustrates the practice of the invention with aluminum chloride (stock VII-A and B), aluminum bromide (VII-C and D), and stannic iodide (VII-F), in comparison to stannic chloride (VII-E) and a control (VII-G).

Table VII

|  |  | VII-A | VII-B | VII-C | VII-D | VII-E [5] | VII-F [5] | VII-G |
|---|---|---|---|---|---|---|---|---|
| GR-I 18 |  | 100 | 100 | 100 | 100 | 100 | 100 | 100 |
| EPC |  | 60 | 60 | 60 | 60 | 60 | 60 | 60 |
| Stearic Acid |  | 1 | 1 | 1 | 1 | 1 | 1 | 1 |
| $AlCl_3 \cdot 6H_2O$ [1] |  | 1 | 2 |  |  |  |  |  |
| $AlBr_3 \cdot 6H_2O$ [1] |  |  |  | 1 | 2 |  |  |  |
| $SnCl_4 \cdot 5H_2O$ [2] |  |  |  |  |  | 1.10 |  |  |
| $SnI_4$ (Anhydrous) [3] |  |  |  |  |  |  | 2 |  |
| ST-137 Resin [4] |  | 6 | 6 | 6 | 6 | 6 | 6 | 6 |
|  | Cured at 350° F., minutes |  |  |  |  |  |  |  |
| Tensile | 5 | 1,590 | ------ | 1,015 | 1,450 | 1,070 | 1,620 | 420 |
|  | 10 | 2,070 | 1,260 | 1,675 | 1,795 | 1,545 | 2,020 | 925 |
|  | 15 | 2,340 | 1,555 | 1,835 | 2,010 | 1,710 | 2,320 | 1,120 |
| Elongation | 5 | 660 | ------ | 750 | 740 | 770 | 480 | >1,100 |
|  | 10 | 610 | 700 | 660 | 580 | 710 | 470 | 1,000 |
|  | 15 | 610 | 630 | 670 | 560 | 600 | 500 | 620 |
| 300% Modulus | 5 | 460 | ------ | 300 | 500 | 310 | 755 | 125 |
|  | 10 | 715 | 395 | 585 | 785 | 465 | 1,130 | 225 |
|  | 15 | 825 | 560 | 590 | 910 | 615 | 1,070 | 360 |
| 500% Modulus | 5 | 1,135 | ------ | 640 | 1,025 | 645 | ------ | 150 |
|  | 10 | 1,765 | 880 | 1,260 | 1,620 | 1,040 | ------ | 465 |
|  | 15 | 1,930 | 1,200 | 1,330 | 1,840 | 1,400 | 2,320 | 800 |
| Hardness | 5 | 54 | ------ | 54 | 58 | 53 | 56 | 53 |
|  | 10 | 59 | 53 | 58 | 61 | 56 | 58 | 56 |
|  | 15 | 61 | 60 | 62 | 63 | 60 | 60 | 55 |

See footnotes at end of table.

Table VII.—Continued

|  |  | VII-A | VII-B | VII-C | VII-D | VII-E [5] | VII-F [5] | VII-G |
|---|---|---|---|---|---|---|---|---|
| *Remix* |  |  |  |  |  |  |  |  |
| Tensile | [6] 5 | 1,040 | 975 |  |  |  |  | 470 |
|  | 10 | 1,375 | 1,280 |  |  |  |  | 915 |
|  | 15 | 1,725 | 1,650 |  |  |  |  | 1,200 |
| Elongation | [6] 5 | 890 | 900 |  |  |  |  | >1,100 |
|  | 10 | 660 | 640 |  |  |  |  | 960 |
|  | 15 | 620 | 620 |  |  |  |  | 800 |
| 300% Modulus | [6] 5 | 270 | 250 |  |  |  |  | 120 |
|  | 10 | 510 | 400 |  |  |  |  | 200 |
|  | 15 | 595 | 560 |  |  |  |  | 340 |
| 500% Modulus | [6] 5 | 565 | 535 |  |  |  |  | 180 |
|  | 10 | 1,100 | 960 |  |  |  |  | 430 |
|  | 15 | 1,375 | 1,280 |  |  |  |  | 705 |
| Hardness | [6] 5 | 53 | 54 |  |  |  |  | 48 |
|  | 10 | 52 | 49 |  |  |  |  | 52 |
|  | 15 | 56 | 55 |  |  |  |  | 54 |

[1] Dissolved in H₂O, added to the masterbatch before the resin hot milled 10' at 235° F. to expel the H₂O.
[2] Ground crystals to a powder, hot milled 5' at 150° F. to disperse.
[3] Ground crystals to a powder, hot milled 5' at 300° F. to disperse.
[4] Added last on cool mill, hot milled 5' at 200° F. to disperse.
[5] The addition of halide in batches E and F are on an equal molar basis.
[6] Cured in foil.

From the foregoing it will be apparent that the invention provides an effective and efficient means for accelerating the cure of butyl rubber with dimethylol phenols. Using the heavy metal halides as accelerators, it is readily possible to obtain such a fast cure that a tensile strength of over 2700 p. s. i. is obtained in 5 minutes at a curing temperature of 350° F. It is also possible to reduce greatly the amount of dimethylol phenol necessary for a good cure. Good physical properties have been obtained in 5 minute cures with as little as 2 parts of resinous dimethylol phenol, when using a heavy metal halide accelerator. Such vulcanizates with reduced dimethylol phenol levels are definitely competitive from an economic standpoint with the usual sulfur cures. Therefore, advantage can be taken of the superior ability of the dimethylol phenol vulcanizates to resist heat without added cost. The invention therefore provides economical vulcanizates having increased service life, especially in applications where the vulcanizate is exposed to the influence of steam or oxygen.

The improved vulcanizates of the invention can be used to great advantage in making a variety of useful articles, such as curing bags of the various known kinds, either for new tires or for re-treading tires, as well as in making hose, belts, inner tubes, especially heavy service inner tubes, and pneumatic tires, especially tire treads and side walls, as well as other objects.

The process of the invention has been described with particular emphasis on the use of heavy metal halides to accelerate the dimethylol phenol cure of butyl rubber, wherein it was desired to substantially completely cure the butyl rubber. However, it will be understood that the accelerating effect of the heavy metal halides on the reaction between dimethylol phenol and butyl rubber can be taken advantage of also in processes where only a limited or partial modification of the butyl rubber by the dimethylol phenol takes place. In such cases, the limited or partial reaction can be carried out in a shorter time, or at a lower temperature, by using the heavy metal halide as accelerator in accordance with the invention. Thus, for example, the partial reaction between butyl rubber and limited amounts of dimethylol phenol, for example, 0.2 to 2.5 parts per 100 parts of butyl rubber, carried out at temperatures of 200°–400° F. for from 5–45 minutes, can be effectively accelerated by the presence of a small amount of heavy metal halide as described. Butyl rubber partially reacted with dimethylol phenol and the process of making the same are disclosed in more detail and claimed in copending application Serial No. 290,344, filed May 27, 1952, now U. S. Patent No. 2,702,287.

Having thus described our invention, what we claim and desire to protect by Letters Patent is:

1. In the method of chemically modifying a synthetic rubbery copolymer of an isoolefin having from 4 to 7 carbon atoms with from 0.5 to 10% of an aliphatic conjugated diolefin having from 4 to 6 carbon atoms by heating the said rubber in admixture with carbon black and a 2,6-dimethylol-4-hydrocarbon phenol, the said hydrocarbon being selected from the group consisting of alkyl, cycloalkyl, aryl and aralkyl radicals, the improvement which comprise the step of carrying out the said modification in the presence of a metal halide in which the said metal is selected from the group consisting of aluminum and heavy metals, said metal halide being present in amount sufficient to accelerate the said modification, said amount being within the range of from a few tenths of a part to 10 parts per 100 parts of said rubber.

2. In the method of chemically modifying a synthetic rubbery copolymer of an isoolefin having from 4 to 7 carbon atoms with from 0.5 to 10% of an aliphatic conjugated diolefin having from 4 to 6 carbon atoms by heating the said rubber in admixture with a resinous, oil-soluble, heat-reactive 2,6-dimethylol-4-hydrocarbon phenol, the said hydrocarbon being selected from the group consisting of alkyl, cycloalkyl, aryl and aralkyl radicals, the improvement which comprises the step of carrying out the said modification in the presence of a metal chloride in which the said metal is selected from the group consisting of aluminum and heavy metals, said metal chloride being present in amount sufficient to accelerate the said modification, said amount being within the range of from a few tenths of a part to 10 parts per 100 parts of said rubber.

3. A method of chemically modifying a synthetic rubbery copolymer of an isoolefin having from 4 to 7 carbon atoms with from 0.5 to 10% of an aliphatic conjugated diolefin having from 4 to 6 carbon atoms which comprises the step of heating the said rubber in admixture with a resinous, oil-soluble, heat-reactive 2,6-dimethylol-4-lower alkyl phenol and tin chloride in amount sufficient to accelerate the said modification, said amount being within the range of from a few tenths of a part to 10 parts per 100 parts of said rubber.

4. A method of chemically modifying a synthetic rubbery coplyomer of an isoolefin having from 4 to 7 carbon atoms with from 0.5 to 10% of an aliphatc conjugated dioolefin having from 4 to 6 carbon atoms comprising the step of heating the said rubber in admixture with a resinous, oil-soluble, heat-reactive 2,6-dimethylol-4-lower alkyl phenol and iron chloride in amount sufficient to accelerate the said modification, said amount being within the range of from a few tenths of a part to 10 parts per 100 parts of said rubber.

5. A method of vulcanizing a synthetic rubbery copolymer of isobutylene with from 0.5 to 5% of isoprene comprising the step of heating the said rubber in admixture with carbon black and a resinous, oil-soluble, heat-reactive 2,6-dimethylol-4-hydrocarbon phenol curative, the said hydrocarbon being selected from the group consisting of alkyl, cycloalkyl, aryl and aralkyl radicals, and a metal chloride in which the said metal is selected from the group consisting of aluminum and heavy metals, the said metal chloride being present in amount of from 1 to 5 parts per 100 parts of said rubber to accelerate the said vulcanization.

6. A method of vulcanizing a synthetic rubbery copolymer of isobutylene with from 0.5 to 5% of isoprene comprising the step of heating the said rubber in admixture with carbon black and a resinous, oil-soluble, heat-reactive 2,6-dimethylol-4-lower alkyl phenol curative and a metal chloride in which the said metal is selected from the group consisting of aluminum and heavy metals, the said metal chloride being present in amount of from 1 to 5 parts per 100 parts of said rubber to accelerate the said vulcanization.

7. A method of vulcanizing a synthetic rubbery copolymer of isobutylene with from 0.5 to 5% of isoprene comprising the step of heating the said rubber in admixture with carbon black and a resinous, oil-soluble, heat-reactive 2,6-dimethylol-4-lower alkyl phenol curative and tin chloride in amount of from 1 to 5 parts per 100 parts of the said rubber, to accelerate the said vulcanization.

8. A method of vulcanizing a synthetic rubbery copolymer of isobutylene with from 0.5 to 5% of isoprene comprising the step of heating the said rubber in admixture with carbon black and a resinous, oil-soluble, heat-reactive 2,6-dimethylol-4-lower alkyl phenol curative and iron chloride in amount of from 1 to 5 parts per 100 parts of the said rubber, to accelerate the said vulcanization.

9. A method of vulcanizing a synthetic rubbery copolymer of isobutylene with from 0.5 to 5% of isoprene comprising the step of heating the said rubber in admixture with carbon black and a resinous, oil-soluble, heat-reactive 2,6-dimethylol-4-tertiary butyl phenol and crystalline stannous chloride in amount of from 1 to 5 parts per 100 parts of the said rubber, to accelerate the said vulcanization.

10. A method of vulcanizing a synthetic rubbery copolymer of isobutylene with from 0.5 to 5% of isoprene comprising the step of heating the said rubber in admixture with carbon black and a resinous, oil-soluble, heat-reactive 2,6-dimethylol-4-octyl phenol and crystalline stannous chloride in amount of from 1 to 5 parts per 100 parts of the said rubber, to accelerate the said vulcanization.

11. A method of vulcanizing a synthetic rubbery copolymer of isobutylene with from 0.5 to 5% of isoprene comprising the step of heating the said rubber in admixture with carbon black and a resinous, oil-soluble, heat-reactive 2,6-dimethylol-4-octyl phenol and crystalline ferric chloride in amount of from 1 to 5 parts per 100 parts of the said rubber, to accelerate the said vulcanization.

References Cited in the file of this patent

UNITED STATES PATENTS

| | | |
|---|---|---|
| 2,211,048 | Bitterich | Aug. 13, 1940 |
| 2,429,397 | Compton et al. | Oct. 21, 1947 |
| 2,536,136 | Lucid | Jan. 2, 1951 |
| 2,560,164 | Garber | July 10, 1951 |

OTHER REFERENCES

Ser. No. 357,662, Wildschut (A. P. C.), published Apr. 20, 1943.

Rubber Age, January 1947, page 449.